United States Patent
Li et al.

(10) Patent No.: US 9,907,111 B2
(45) Date of Patent: *Feb. 27, 2018

(54) DISCONTINUOUS TRANSMISSION FOR A MOBILE PHONE NETWORK NODE

(71) Applicant: Telefonaktiebolaget L M Ericsson (publ), Stockholm (SE)

(72) Inventors: Weigang Li, Ottawa (CA); Xiaoming Lai, Ottawa (CA); Xixian Chen, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 126 days.

This patent is subject to a terminal disclaimer.

(21) Appl. No.: 14/957,874

(22) Filed: Dec. 3, 2015

(65) Prior Publication Data
US 2016/0157294 A1  Jun. 2, 2016

Related U.S. Application Data

(63) Continuation of application No. 14/279,082, filed on May 15, 2014, now Pat. No. 9,215,744.

(51) Int. Cl.
*H04W 4/00* (2009.01)
*H04W 76/04* (2009.01)
(Continued)

(52) U.S. Cl.
CPC ......... *H04W 76/048* (2013.01); *H04L 5/0053* (2013.01); *H04W 28/0205* (2013.01);
(Continued)

(58) Field of Classification Search
None
See application file for complete search history.

(56) References Cited

U.S. PATENT DOCUMENTS 6,005,852 A * 12/1999 Kokko ............... H04W 28/14
370/329
6,438,119 B1  8/2002 Kim
(Continued)

FOREIGN PATENT DOCUMENTS

EP  2 346 289 A1  7/2011
EP  2 544 491  1/2013
(Continued)

OTHER PUBLICATIONS

PCT Notification of Transmittal of the International Search Report and the Written Opinion of the International Searching Authority, or the Declaration for International application No. PCT/IB2015/052371—Jun. 29, 2015.

(Continued)

*Primary Examiner* — Zewdu A Beyen
(74) *Attorney, Agent, or Firm* — Patent Portfolio Builders, PLLC

(57) ABSTRACT

A mobile phone network node may determine traffic load associated with a mobile phone network and initiate discontinuous transmission at a frame level, based at least in part upon, determining that the traffic load is less than a first threshold. The mobile phone network node may further initiate discontinuous transmission at a subframe level, based at least in part upon, determining that the traffic load is greater than the first threshold and less than a second threshold and initiate discontinuous transmission at a symbol level, based at least in part upon, determining that the traffic load is greater than the second threshold.

24 Claims, 12 Drawing Sheets

(51) Int. Cl.
  *H04L 5/00* (2006.01)
  *H04W 28/02* (2009.01)
  *H04W 72/04* (2009.01)
  *H04W 52/02* (2009.01)
  *H04W 52/28* (2009.01)

(52) U.S. Cl.
  CPC ... *H04W 52/0206* (2013.01); *H04W 72/0446* (2013.01); *H04W 52/288* (2013.01); *Y02B 60/50* (2013.01)

(56) References Cited

U.S. PATENT DOCUMENTS

| | | |
|---|---|---|
| 6,590,874 B1 | 7/2003 | Wang et al. |
| 9,008,048 B2 | 4/2015 | Liu |
| 9,014,131 B2 | 4/2015 | Yang |
| 9,014,349 B2 | 4/2015 | Grigoriev |
| 9,030,990 B1 | 5/2015 | Shah |
| 9,036,617 B2 | 5/2015 | Pelletier |
| 9,042,829 B2 | 5/2015 | Palin |
| 2003/0128744 A1* | 7/2003 | Yeo ................... H04B 1/70755 375/147 |
| 2004/0196931 A1 | 10/2004 | Yuan |
| 2012/0014361 A1 | 1/2012 | Jung |
| 2013/0070635 A1 | 3/2013 | Suo |
| 2013/0315182 A1* | 11/2013 | Kitou ................ H04W 72/1289 370/329 |

FOREIGN PATENT DOCUMENTS

| | | |
|---|---|---|
| EP | 2677820 | 12/2013 |
| WO | 2011/147450 A1 | 12/2011 |

OTHER PUBLICATIONS

ETSI TR 125 927 V11.0.0; Technical Report; Universal Mobile Telecommunications System (UMTS); Solutions for energy saving within UTRA Node b (3GPP TR 25.927 version 11.0.0 Release 11) Sep. 2012.

3GPP TR 36.872 V12.1.0; Technical Report; 3rd Generation Partnership Project; Technical Specification Group Radio Access Network; Small cell enhancements for E-UTRA and E-UTRAN—physical layer aspects (Release 12) Dec. 2013.

Vinod Mirchandani and Peter Bertok; "Optimized Energy Management for Mixed Uplink Traffic in LTE UE;" 2013 Academy Publisher; doi: 10.4304/jnw.8.3./ pp. 537-551; Journal of Networks; vol. 8, No. 3.; Mar. 2013.

Giovanni Stea, Daniele Migliorini, Dario Sabella, Marco Caretti; "Power-aware allocation of MBSFN subframes using Discontinuous Cell Transmission in LTE systems;" Sep. 2013; In proceeding of: CLEEN 2013, at Las Vegas, 2 pages; http://www.researchgate.net/publication/257823433_Power-aware allocation of MBSFN Sep. 2013.

\* cited by examiner

DISCONTINUOUS TRANSMISSION FOR A MOBILE PHONE NETWORK NODE

PRIORITY

This application is a continuation, under 35 U.S.C. § 120, of U.S. application Ser. No. 14/279,082 filed May 15, 2014, entitled "DISCONTINUOUS TRANSMISSION FOR A MOBILE PHONE NETWORK NODE" which is hereby incorporated by reference in its entirety.

TECHNICAL FIELD

Particular embodiments relate generally to wireless communications and more particularly to discontinuous transmission for a mobile phone network node.

BACKGROUND

In a wireless network, a wireless device may communicate with one or more radio access nodes to send and/or receive information, such as voice traffic, data traffic, control signals, etc., creating network traffic load. The traffic load pattern varies based on a variety of factors. For example, the network traffic load is different during day time and night time. It may be different in summer time and in winter time and it may be different during normal days and holidays or special event days. Too few cells will cause a coverage problem as well as additional problems when the traffic load is high. Too many cells will cause waste when the traffic load is low and will generate interference to neighbor cells as well as negatively impacting the environment due to radiation and excessive electricity use.

Various unsuccessful attempts have been made to deal with these issues. For example, a popular solution is to combine the cells when the traffic load is low. However, the problem for this potential solution is that the coverage will be reduced. Moreover, this potential solution also requires cell shut down and startup which is wasteful and burdensome.

SUMMARY

According to some embodiments, a mobile phone network node may be operable to determine traffic load associated with a mobile phone network and initiate discontinuous transmission at a frame level, based at least in part upon, determining that the traffic load is less than a first threshold. The mobile phone network node is further operable to initiate discontinuous transmission at a subframe level, based at least in part upon, determining that the traffic load is greater than the first threshold and less than a second threshold and initiate discontinuous transmission at a symbol level, based at least in part upon, determining that the traffic load is greater than the second threshold.

In some embodiments, the mobile phone network node may determine whether a symbol includes a reference signal and may allocate data to the symbol that includes a reference signal. According to some embodiments, the mobile phone network node may determine whether a symbol includes a reference signal and use the symbol for discontinuous transmission if the symbol does not include a reference signal.

According to some embodiments, a discontinuous transmission method for an Evolved Node B may include determining traffic load associated with a mobile phone network and initiating discontinuous transmission at a frame level, based at least in part upon, determining that the traffic load is less than a first threshold. The method may also include initiating discontinuous transmission at a subframe level, based at least in part upon, determining that the traffic load is greater than the first threshold and less than a second threshold and initiating discontinuous transmission at a symbol level, based at least in part upon, determining that the traffic load is greater than the second threshold.

In at least some embodiments, a discontinuous transmission system may include a memory and a processor. The processor may be operable to determine traffic load associated with a mobile phone network and initiate discontinuous transmission at a frame level, based at least in part upon, determining that the traffic load is less than a first threshold. The processor is further operable to initiate discontinuous transmission at a subframe level, based at least in part upon, determining that the traffic load is greater than the first threshold and less than a second threshold and initiate discontinuous transmission at a symbol level, based at least in part upon, determining that the traffic load is greater than the second threshold.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Wireless device communication with radio network nodes generates network traffic load. Various factors may dictate what the traffic load may be at a particular point in time. To conserve resources, cells may be selectively turned on or off. However, too few cells cause a coverage problem as well as additional problems when the traffic load is high. On the other hand, too many cells waste resources when the traffic load is low, will generate interference to neighboring cells, and may negatively impact the environment due to radiation and excessive electricity use.

Particular embodiments of the present disclosure may provide solutions to these and/or other problems. For example, a method of discontinuous transmission (DTX) may be implemented in a radio network node (e.g., an eNodeB) in a mobile phone network (e.g., LTE mobile communication network). DTX may be implemented in multiple levels. The minimum DTX level is in the orthogonal frequency-division multiplexing (OFDM) symbol level. If too many symbols are in DTX, then DTX at the subframe or frame level can be used. Because of this approach, the signaling may remain simple. Whether the DTX is in the OFDM symbol, subframe, or frame levels will depend on the traffic load at the radio network node. For example, when network traffic is low during the night time, non-transmission at the subframe or frame level can be used. However, when network traffic is higher but there are some unused resource elements in some of the subframes, then DTX in one or more OFDM symbols in a subframe may be considered.

When frame level. DTX is used, DTX at the subframe and symbol level can still be used. For example, when frame level DTX is used, DTX at the subframe and/or symbol level can also be used for the frames that were not used for DTX. When subframe level DTX is used, DTX at the symbol level can still be used. As an example, when subframe level DTX is used, DTX at the symbol level may be used for subframes that were not used for DTX. The traffic load may be estimated by using an algorithm presented in this disclosure. Selection of the DTX levels (e.g., symbol, subframe, or frame level) is based on the estimated traffic load. When DTX at the subframe or frame level is selected, the information may be signaled by a broadcast signal message. When the symbol level DTX level is selected, the information may be signaled by a downlink control information (DCI) message transmitted on the physical downlink control channel (PDCCH) in that subframe. The scheduler will allocate the resources to the traffic data packets on the non-DTX symbols and the non-DTX subframes to frames accordingly.

Particular embodiments are described in FIGS. 1-12 of the drawings, like numerals being used for like and corresponding parts of the various drawings.

Figure 1:
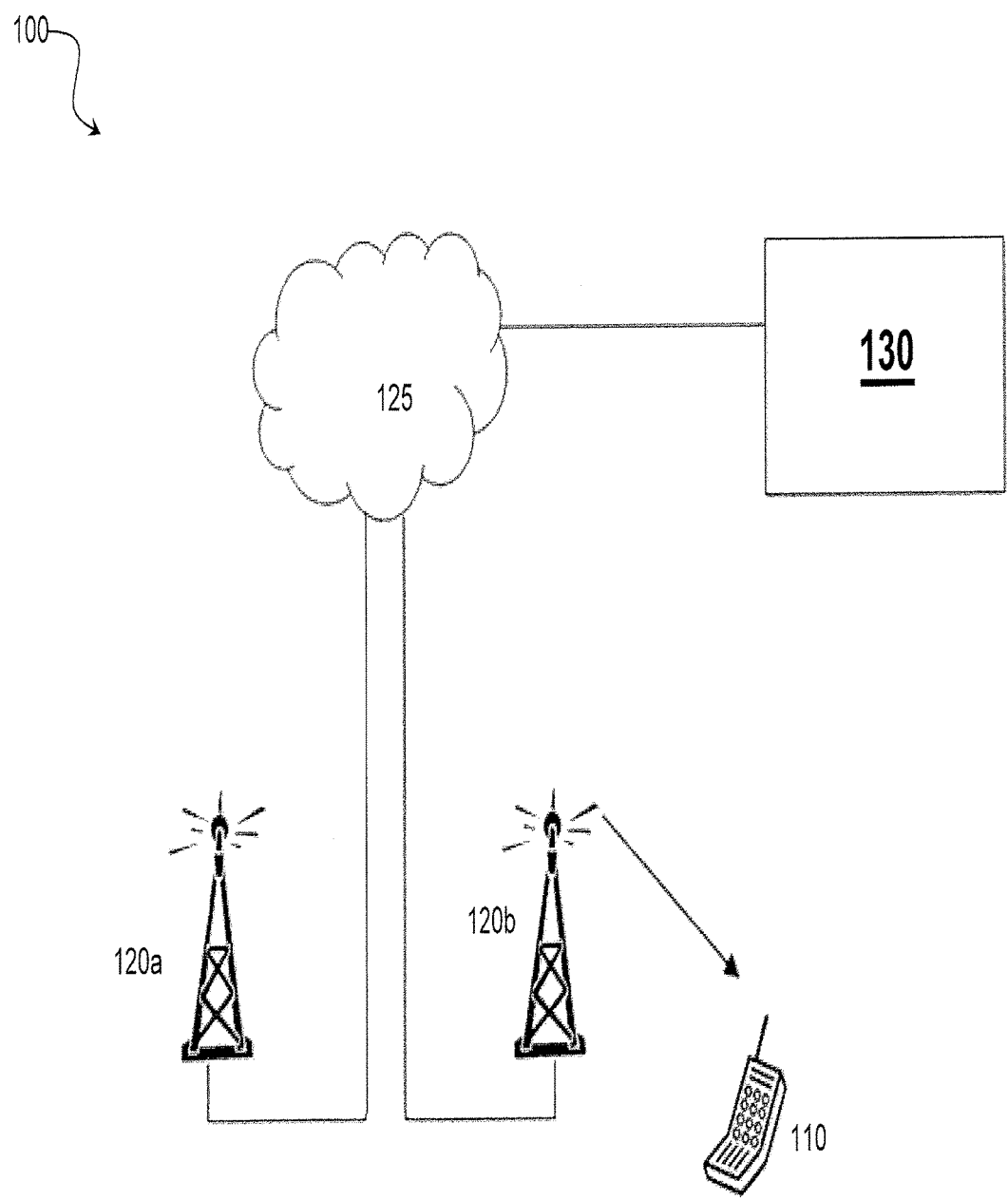
FIG. 1 is a block diagram illustrating an example of a network.

FIG. 1 is a block diagram illustrating an example of a network 100 that includes one or more wireless communication devices 110 and a plurality of network nodes. The network nodes include radio network nodes 120 and core network nodes 130. In the example, wireless communication device 110 communicates with radio network node 120b over a wireless interface. For example, wireless communication device 110 transmits wireless signals to radio network node 120b and/or receives wireless signals from radio network node 120b. The wireless signals contain voice traffic, data traffic, control signals, and/or any other suitable information.

A radio network node 120 refers to any suitable node of a radio access network/base station system. Examples include a radio access node (such as a base station or eNodeB) and a radio access controller (such as a base station controller or other node in the radio network that manages radio access nodes). Radio network node 120 interfaces (directly or indirectly) with core network node 130. For example, radio network node 120 interfaces with core network node 130 via an interconnecting network 125. Interconnecting network 125 refers to any interconnecting system capable of transmitting audio, video, signals, data, messages, or any combination of the preceding. Interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 130 manages the establishment of communication sessions and various other functionality for wireless communication device 110. Wireless communication device 110 exchanges certain signals with core network node 130 using the non-access stratum layer. In non-access stratum (NAS) signaling, signals between wireless communication device 110 and core network node 130 pass transparently through radio network nodes 120. Examples of radio network node 120, wireless communication device 110, and core network node 130 are described with respect to FIGS. 2, 3, and 4 respectively.

It should be noted that although the present disclosure may discuss one or two antenna examples, this disclosure is also applicable to networks involving three or more antennas.

Figure 2:
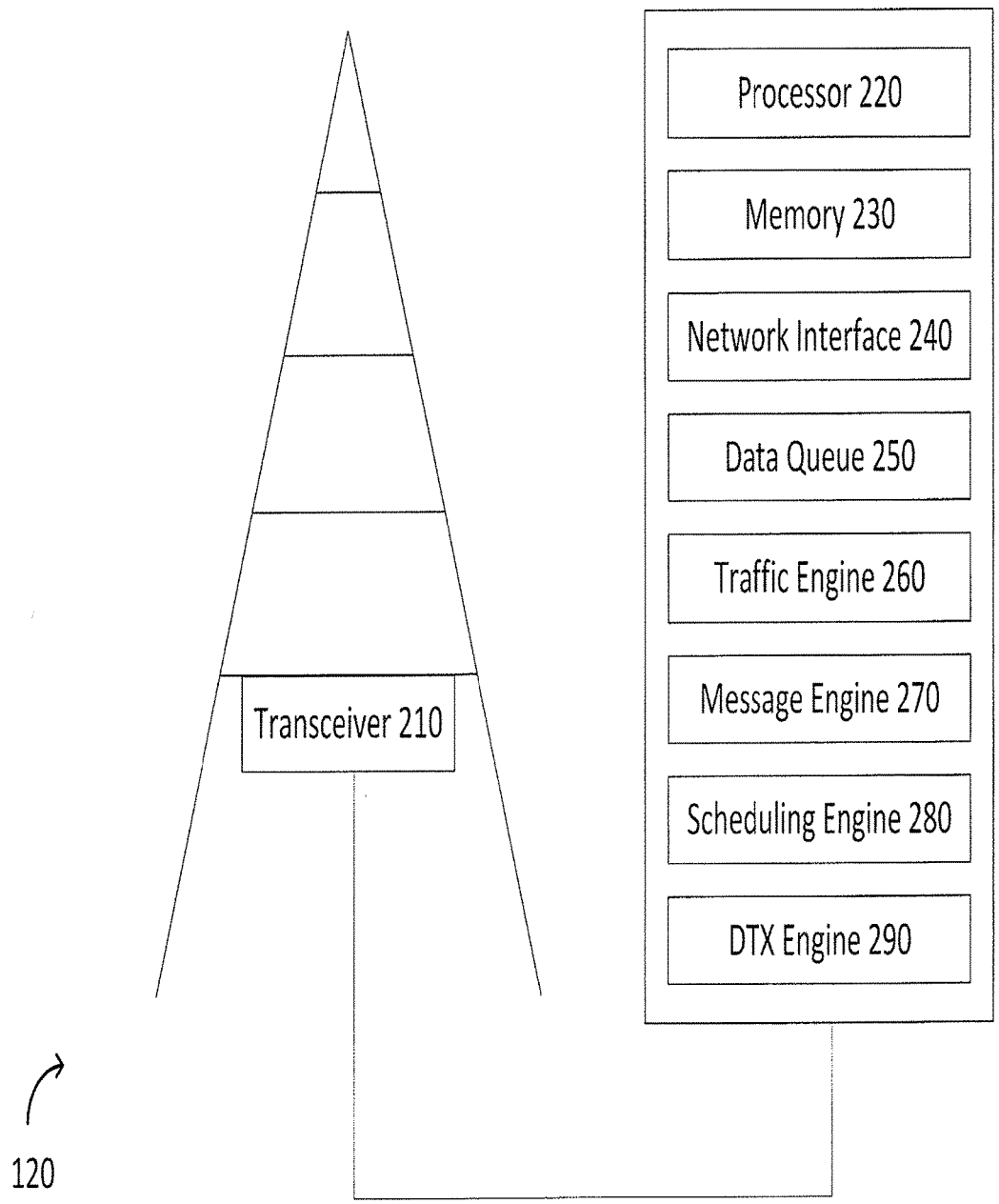
FIG. 2 is a block diagram illustrating embodiments of a radio network node.

FIG. 2 is a block diagram illustrating embodiments of a radio network node. In the illustration, radio network node 120 is shown as a radio access node, such as an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Other radio network nodes 120, such as one or more radio network controllers, may be configured between the radio access nodes and core network nodes 130. These other radio network nodes 120 may include processors, memory, and interfaces similar to those described with respect to FIG. 2, however, these other radio network nodes might not necessarily include a wireless interface, such as transceiver 210.

Radio access nodes are deployed throughout network 100 as a homogenous deployment, heterogeneous deployment, or mixed deployment. A homogeneous deployment generally describes a deployment made up of the same (or similar) type of radio access nodes and/or similar coverage and cell sizes and inter-site distances. A heterogeneous deployment generally describes deployments using a variety of types of radio access nodes having different cell sizes, transmit powers, capacities, and inter-site distances. For example, a heterogeneous deployment may include a plurality of low-power nodes placed throughout a macro-cell layout. Mixed deployments include a mix of homogenous portions and heterogeneous portions.

Radio network node 120 includes one or more of transceiver 210, processor 220, memory 230, and network interface 240. Radio network node 120 may also include data queue 250, traffic engine 260, message engine 270, scheduling engine 280, and/or DTX engine 290.

Transceiver 210 facilitates transmitting wireless signals to and receiving wireless signals from wireless communication device 110 (e.g., via an antenna), processor 220 executes instructions to provide some or all of the functionality described above as being provided by a radio network 120, memory 230 stores the instructions executed by processor 220, and network interface 240 communicates signals to backend network components, such as a gateway, switch, router, Internet, Public Switched Telephone Network (PSTN), other radio network nodes 120, core network nodes 130, etc.

Processor 220 includes any suitable combination of hardware and software implemented in one or more modules to execute instructions and manipulate data to perform some or all of the described functions of radio network node 120. In some embodiments, processor 220 includes, for example, one or more computers, one or more central processing units (CPUs), one or more microprocessors, one or more applications, and/or other logic.

Memory 230 is generally operable to store instructions, such as a computer program, software, an application including one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 240 is communicatively coupled to processor 220 and refers to any suitable device operable to receive input for radio network node 120, send output from radio network node 120, perform suitable processing of the input or output or both, communicate to other devices, or any combination of the preceding. Network interface 240 includes appropriate hardware (e.g., port, modem, network interface card, etc.) and software, including protocol conversion and data processing capabilities, to communicate through a network.

Radio network node 120 may include data queue 250. Data queue 250 may be any combination of software, hardware, and/or firmware that allows radio network node to queue electronic data. In certain embodiments, data queue 250 may be stored in memory 230. In certain embodiments, data in data queue 250 may be queued for allocation to an OFDM symbol and subsequent transfer to wireless communication device 110. In at least some embodiments, a priority may be associated with the data stored in data queue 250. For example, portions of data in data queue 250 may be considered "high priority," "low priority," or "medium priority."

Radio network node 120 may use scheduling engine 280 to schedule data in data queue 250 for transfer to wireless communication device 110. Generally, scheduling engine 280 may allocate resource elements to traffic data packets on symbols, subframes, and frames. More specifically, scheduling engine 280 may be any combination of software, hardware, and/or firmware that allows radio network node 120 to schedule data in data queue 250 for transmission. In certain embodiments, scheduling engine 280 may map resource elements to OFDM symbols. According to some embodiments, scheduling engine 280 may schedule the traffic on the resource elements of a particular subframe.

In at least some embodiments, the data allocation performed by scheduling engine 280 is based on OFDM symbols. Considering the downlink control channel allocation (one to four symbols of the first slot of each subframe) and downlink reference signal allocation, the data allocation for user traffic may start from symbols used for transmitting the reference signals (symbol 0 and 4 for every slot), then move to the symbols used for transmitting data only. Scheduling engine 280 is also capable of re-queuing data back into data queue 250 in order to be transmitted in a subsequent (e.g., next) scheduling time slot if the symbol is not fully allocated and the priority of the data in that symbol is not high enough.

Figure 8:
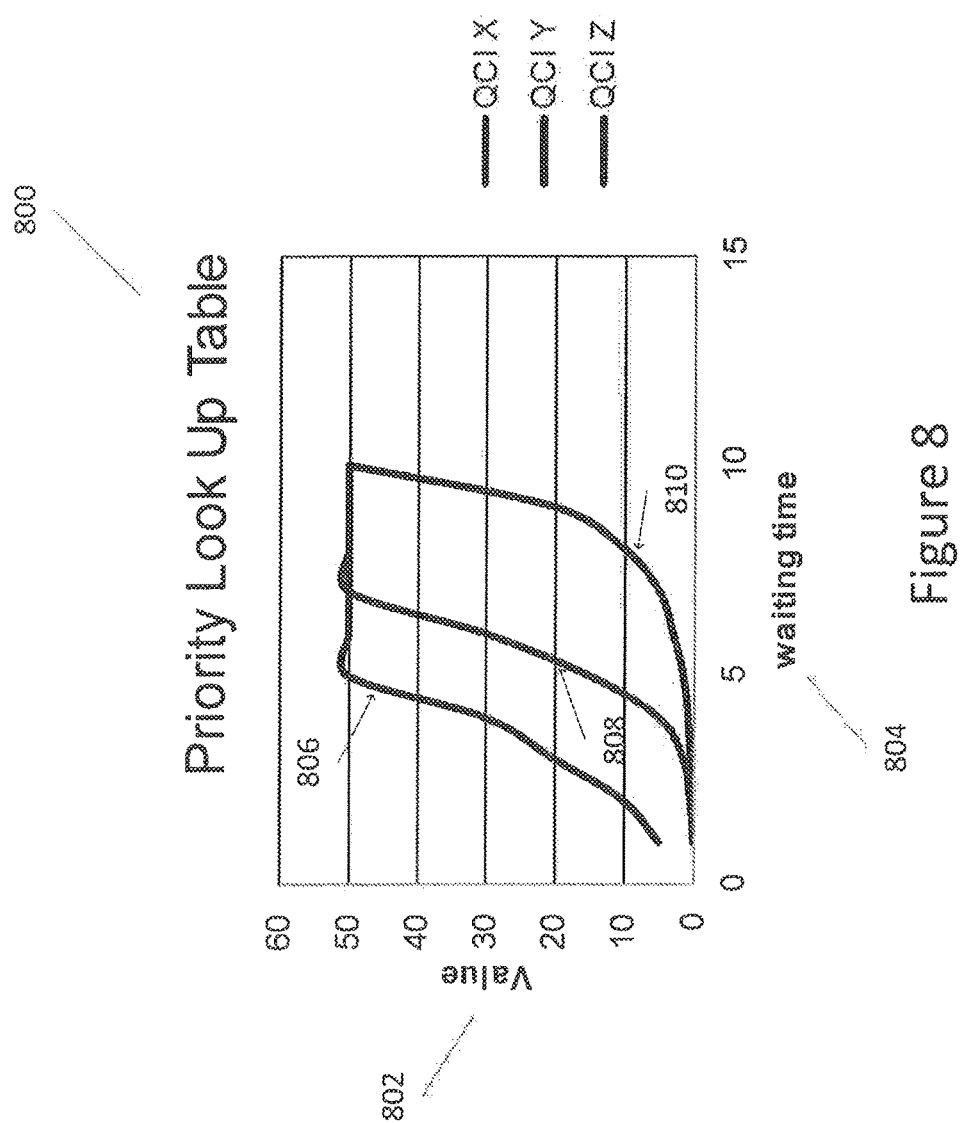
FIG. 8 is a graph illustrating example data that may be used in a priority lookup table.

Scheduling engine 280 may also determine data priority associated with data in data queue 250. For example, data priority may be based on quality of service (QoS) input, channel condition(s), and data waiting time associated with data in data queue 250. Example priorities may be high, medium and low. The data allocation, at least in some embodiments, may start from high priority, then medium priority, and then low priority. The actual priority of data may be presented as a real value. FIG. 8, discussed below, is an example lookup table that may be used for priority determination.

Another function of scheduling engine 280 may be resource element (RE) estimation. Scheduling engine 280 may determine how many REs are needed for data located in data queue 250 at a particular time. In some embodiments, data allocation may be per RE instead of per physical resource block (PRB). An example algorithm for calculating the number of REs may be determining the suitable modulation and coding scheme (MCS) and transport block size (TBS). The MCS and TBS are determined by the combination of RF channel estimation, link adaptation, and QoS requirements. These are determined per user and per priority queue (e.g., data queue 250). The number of REs to be allocated can then be calculated based on the MCS, TBS, and the prioritized data in data queue 250.

Scheduling engine 280 may also map REs to symbols. An example of how scheduling engine 280 may map REs to symbols is discussed further below with regard to FIG. 9.

Radio network node 120 may also include traffic engine 260. Generally, radio network node 120 may use traffic engine 260 to determine traffic load associated with network 100. More specifically, traffic engine 260 may be any combination of software, hardware, and/or firmware that allows radio network node 120 to determine a traffic load estimation. In certain embodiments, traffic engine 260 may calculate a daily average traffic load which may be a calculated traffic load over the course of a certain number of days. According to some embodiments, traffic engine 260 may calculate a current traffic load which may be a calculated traffic load over the course of a certain number of seconds. Traffic engine 260 may also use calculated traffic loads to calculate a predicted traffic load. For example, traffic engine 260 may use the following function to calculate a predicted traffic load: "$f(t)=a*f\_d(t)+(1-a)*f\_i(t)$" where "$f\_d(t)$" represents the daily traffic load, "$f\_i(t)$" represents instant traffic load at a current time "t," and "a" is a smoothing factor between 0 and 1.

Radio network node 120 may also include message engine 270. Generally, message engine 270 may be used by radio network node 120 to communicate any suitable message. More specifically, message engine 270 may be any combination of software, hardware, and/or firmware that allows radio network node 120 to communicate a message to any component of network 100. For example, message engine 270 may generate a PDCCH message, a broadcast message, a synchronization message, a signal message, and/or any other message suitable for a particular purpose. In some embodiments, message engine 270 may alter and/or set one or more bits in a message. According to certain embodiments, message engine 270 may alter (e.g., by removing or adding) the total number of bits in a message.

Radio network node 120 may also include DTX engine 290. Generally, radio network node 120 may use DTX engine 290 to make various decisions regarding the implementation of DTX at the symbol, subframe, and/or frame levels. More specifically, DTX engine 290 may be any combination of software, hardware, and/or firmware that allows radio network node 120 to determine at what level DTX may be implemented and how DTX should be implemented. For example, DTX engine 290 may use traffic engine 260 to determine a predicted traffic load estimation to determine what DTX schemes should be utilized (e.g., symbol-based, subframe-based, or frame-based). If DTX engine 290 determines traffic load is low, it may select frame-based DTX. Otherwise, DTX engine 290 may consider using subframe-based or symbol-based DTX.

In one embodiment, DTX engine 290 may determine subframe and frame DTX based on traffic load. For example, DTX engine 290 may utilize traffic engine 260 to calculate a percentage of OFDM symbols used in one frame to indicate traffic load. The following table shows various traffic states and their corresponding thresholds and parameters:

TABLE 1

Example traffic load states and corresponding thresholds and parameters

| State | Threshold | Waiting Time | Hysteresis | Description |
|---|---|---|---|---|
| 0 | TH(0) | WT(0) | HY(0) | This state corresponds to high traffic load, and there may not be DTX in subframe or frame in this state. At a high traffic load, DTX may be initiated at the symbol level. When the measured traffic load is below (TH(0) − HY(0)) for WT(0) time, it will move to state 1. Otherwise, it will stay in this state. |
| k = 1, 2, 3 | TH(k) | WT(k) | HY(k) | This state corresponds to medium traffic load. $2^k$ number of subframes are DTXed, in this state, where k may be 1, 2, or 3. When the measured traffic load is below (TH(k) − HY(k)) for WT(k) time, it will move to state = k + 1. When the measured traffic load is above (TH(k) + HY(k)) for WT(k) time, it will move to state = k − 1. If the measured traffic load is between (TH(k) − HY(k)) and (TH(k) + HY(k)), it will stay in this state. |
| 4 | TH(4) | WT(4) | HY(4) | This state corresponds to low traffic load. Odd frames, and up to eight subframes of even frames may be DTXed in this state. When the measured traffic load is above (TH(4) + HY(4)) for WT(4) time, it will move to state 3. Otherwise, it will stay in this state. |

The DTX determination example in the table above is discussed further in conjunction with FIG. 10 below. Additionally, DTX engine 290 may implement DTX at multiple levels. For example, when frame level DTX is used, DTX engine 290 may also implement DTX at the subframe and/or symbol level for frames that were not used for DTX. As another example, when subframe level DTX is used, DTX engine 290 may also implement DTX at the symbol level for subframes that were not used for DTX. DTX engine 290 is operable to implement DTX in any combination as suitable for a particular purpose.

Other embodiments of radio network node 120 include additional components (beyond those shown in FIG. 2) responsible for providing certain aspects of the radio network node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Some embodiments of the disclosure may provide one or more technical advantages. For example, in some embodiments, energy consumption and radiation is reduced, thus limiting green-house gas emissions and global warming. Another technical advantage of certain embodiments is that it reduces power consumption of both mobile wireless communication devices and radio network nodes thereby improving energy efficiency and reducing electricity costs. Some embodiments provide the advantage of reducing interference of neighboring cells. Particular embodiments provide technical advantages without requiring modification to existing mobile wireless communication devices. The granularity for this DTX implementation ranges from radio frame or subframe level to the symbol level. This results in the DTX implementation being very flexible and scalable. The implementation of having the flexible symbol level, subframe level, and frame level DTX means that cell reference signals will remain in the non-DTX subframes, and, thus, mobile wireless communication devices will still be able to easily decode the down-link information. Moreover, because the subframes which have broadcast and synchronization signals will not be used for DTX subframes, there is no impact on mobile wireless communication devices to access the network.

Some embodiments may benefit from some, none, or all of these advantages. Other technical advantages may be readily ascertained by one of ordinary skill in the art.

Figure 3:
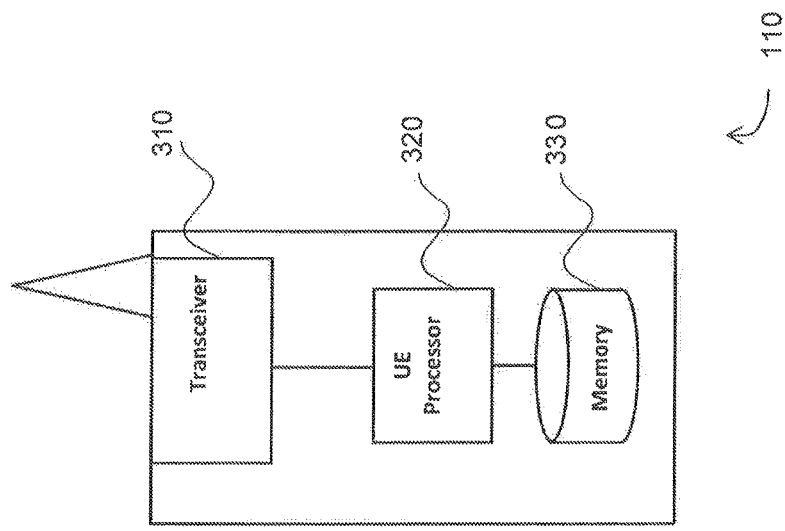
FIG. 3 is a block diagram illustrating embodiments of a wireless device.

FIG. 3 is a block diagram illustrating embodiments of a wireless communication device. Examples of wireless communication device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless communication device 110 may also be referred to as user equipment (UE), a station (STA), a mobile station (MS), a device, a wireless device, or a terminal in some embodiments. Wireless communication device 110 includes transceiver 310, processor 320, and memory 330. In some embodiments, transceiver 310 facilitates transmitting wireless signals to and receiving wireless signals from radio network node 120 (e.g., via an antenna), processor 320 executes instructions to provide some or all of the functionality described above as being provided by wireless communication device 110, and memory 330 stores the instructions executed by processor 320.

Processor 320 includes any suitable combination of hardware and software implemented in one or more modules to execute instructions and manipulate data to perform some or all of the described functions of wireless communication device 110. In some embodiments, processor 320 includes, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless communication device 110 include additional components (beyond those shown in FIG. 3) responsible for providing certain aspects of the wireless communication device's functionality, including any of the functionality described above and/or any additional functionality (including any functionality necessary to support the solution described above).

Figure 4:
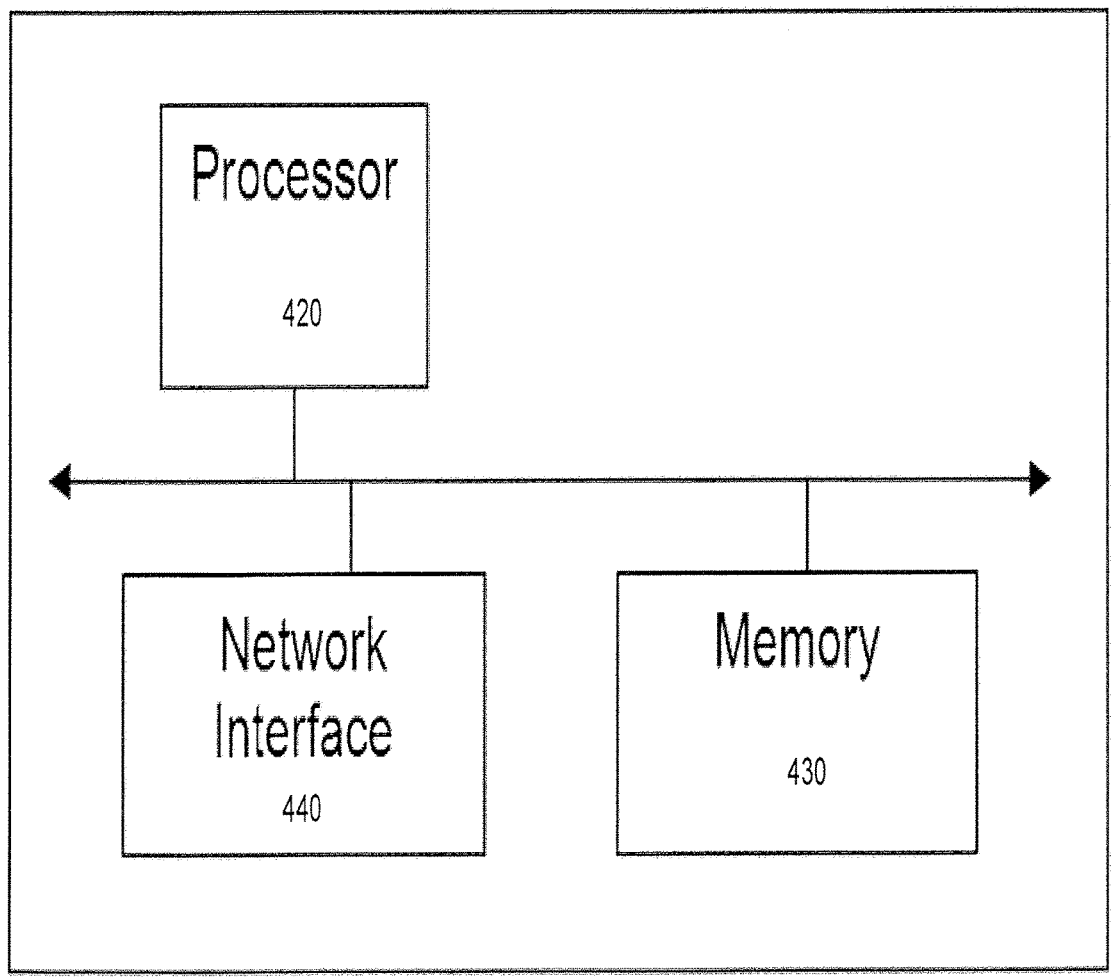
FIG. 4 is a block diagram illustrating embodiments of a core network node.

FIG. 4 is a block diagram illustrating embodiments of a core network node. Examples of core network node 130 can include a mobile switching center (MSC), a serving GPRS support node (SGSN), a mobility management entity (MME), a radio network controller (RNC), a base station controller (BSC), and so on. Core network node 130 includes processor 420, memory 430, and network interface 440. In some embodiments, processor 420 executes instructions to provide some or all of the functionality described above as being provided by core network node 130, memory 430 stores the instructions executed by processor 420, and network interface 440 communicates signals to an suitable node, such as a gateway, switch, router, Internet, Public Switched Telephone Network (PSTN), radio network nodes 120, other core network nodes 130, etc.

Processor 420 includes any suitable combination of hardware and software implemented in one or more modules to execute instructions and manipulate data to perform some or all of the described functions of core network node 130. In some embodiments, processor 420 includes, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and may refer to any suitable device operable to receive input for core network node 130, send output from core network node 130, perform suitable processing of the input or output or both, communicate to other devices, or any combination of the preceding. Network interface 440 includes appropriate hardware (e.g., port, modem, network interface card, etc.) and software, including protocol conversion and data processing capabilities, to communicate through a network.

Other embodiments of core network node 130 include additional components (beyond those shown in FIG. 4) responsible for providing certain aspects of the core network node's functionality, including any of the functionality described above and/or any additional functionality (including any functionality necessary to support the solution described above).

Figure 5:
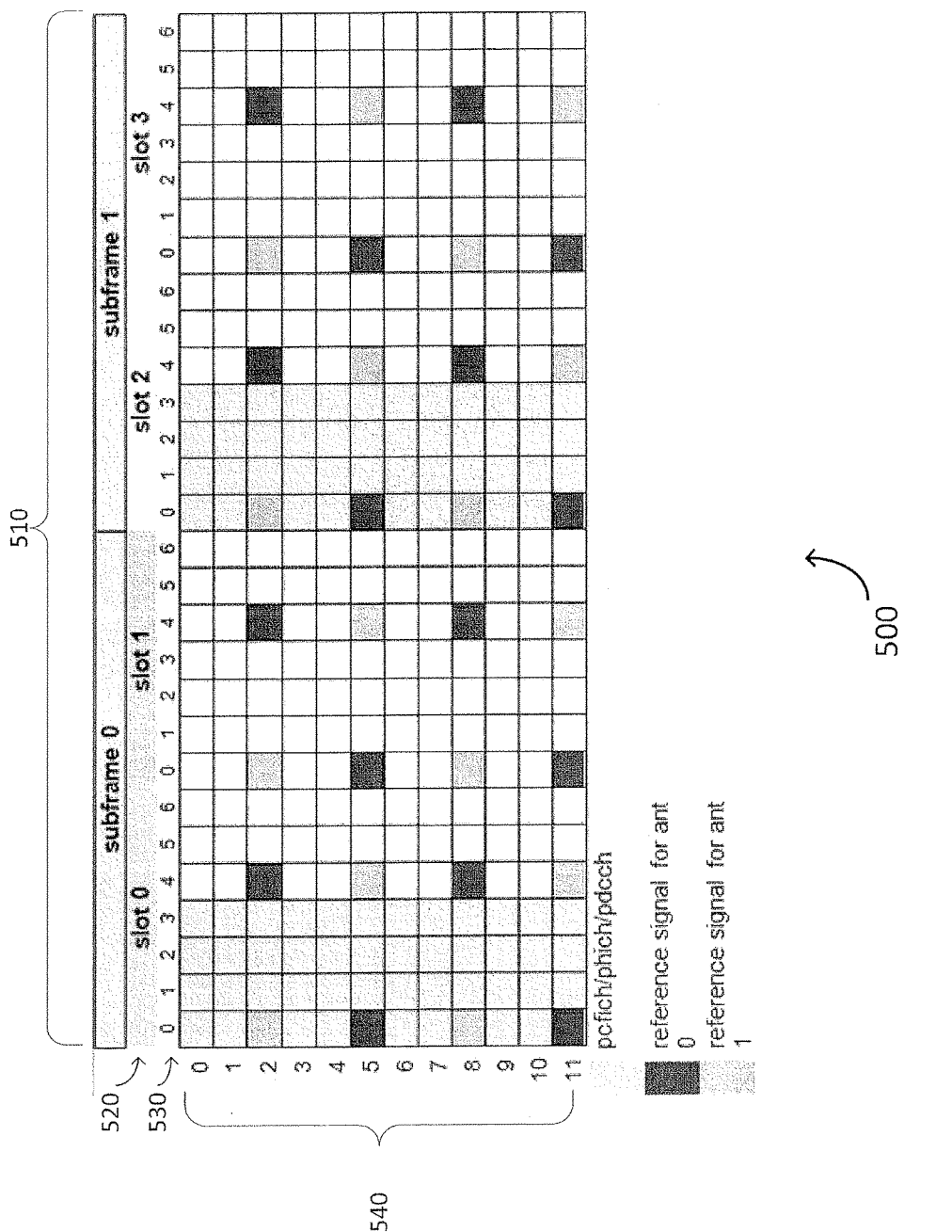
FIG. 5 is a an example downlink resource element diagram.

FIG. 5 is an example downlink resource element diagram. Example downlink resource element diagram 500 is an example of downlink resource element allocation that may be used by the systems of FIGS. 1, 2, 3, and/or 4. In certain embodiments, downlink resource element diagram 500 may be an example of resource element allocation performed by scheduling engine 280 and/or DTX engine 290. Downlink resource element diagram 500 includes subframes 510, slots 520, symbols 530, and subcarriers 540. In the example diagram, two subframes 510 are depicted: "subframe 0" and "subframe 1." Two slots 520 are shown per subframe 510: "slot 0" and "slot 1" for "subframe 0" and "slot 2" and "slot 3" for "subframe 1." Example downlink resource element diagram 500 also depicts subcarriers 540. In this example, twelve subcarriers 540 are depicted numbered 0 through 11. Certain symbols may include cell reference signals. For example, in FIG. 5, for slot 520 "slot 0," symbol 530 "0" at subcarrier 540 "5" is depicted as containing a reference signal for "ant 0" which may be a first antenna. For slot 520 "slot 0," symbol 530 "0" at subcarrier 540 "8" is depicted as carrying a reference signal for "ant 1" which may be a second antenna. Resource elements not containing reference signals may be used for content (e.g., data or messages) related to PDCCH, physical control format indicator channel (PCFICH), and/or physical hybrid-ARQ indicator channel (PHICH). For example symbols 530 1, 2, and 3 of slot 520 "slot 0" is depicted as containing such content. In the example diagram, PCFICH, PHICH, and/or PDCCH could use any of the first four symbols 530 to transmit content as long as the particular resource element does not contain a reference signal (e.g., symbol 530 0 at subcarrier 540 2 as discussed above). In certain embodiments, DTX may not be performed in symbols 530 that contain a cell reference signal. For example, FIG. 5 depicts two symbols 530 in slot 520 "slot 0" and two symbols 530 in slot 520 "slot 1" as including cell reference signals. Therefore, in this example, DTX may not be performed in those symbols 530 but may be performed in any of the remaining ten symbols 530 of subframe 520 "subframe 0."

Figure 6:
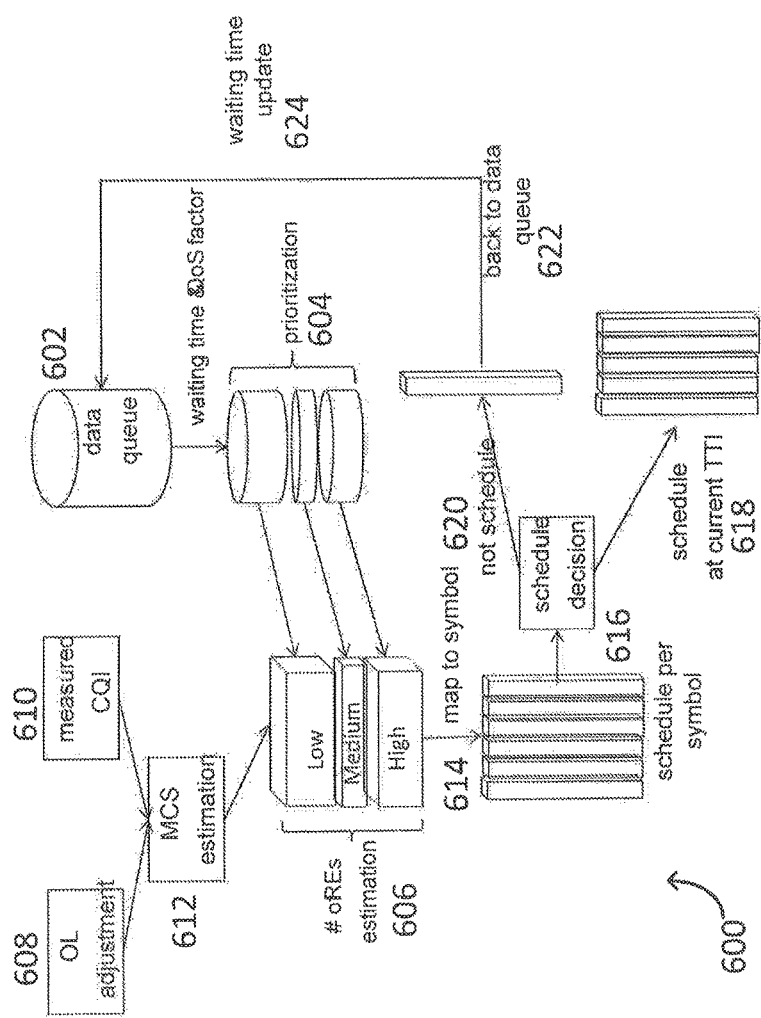
FIG. 6 is a flow chart illustrating example embodiments of data scheduling.

FIG. 6 is a flow chart illustrating example embodiments of data scheduling. Example method 600 is an example of scheduling that may be performed using the systems described in FIGS. 1, 2, 3, and/or 4. At step 602, data may be received at data queue 250. At step 604, data prioritization may be determined for the data in data queue 250. Prioritization may be based on the wait time associated with a particular unit of data, quality of service input, and channel conditions. Next, at step 606, a number of resource elements may be estimated for allocating data in data queue 250. This may be based on an open loop (OL) adjustment, determined at step 608, a measure channel quality indication (CQI), determined at step 610, and an MCS estimation, determined at step 612. Resource element mapping may then be performed at step 614 based on priority of the data in data queue 250. Priority will be given to high priority data first, then medium priority, then low priority. At step 616, a scheduling decision may be made. In certain embodiments, this decision may be made using scheduling engine 280 and/or DTX engine 290. For example, certain symbols mapped to certain data (e.g., high, medium, and/or low priority data) may be scheduled for a current transmission time interval (TTI) at step 618 while it may be also determine, at step 620, certain symbols mapped to only low priority data may not be scheduled. As a result of the symbol not being scheduled, at step 622, the data originally mapped to the symbol may be re-placed in data queue 250, and at step 624, an associated waiting time for the data may be updated.

Figure 7:
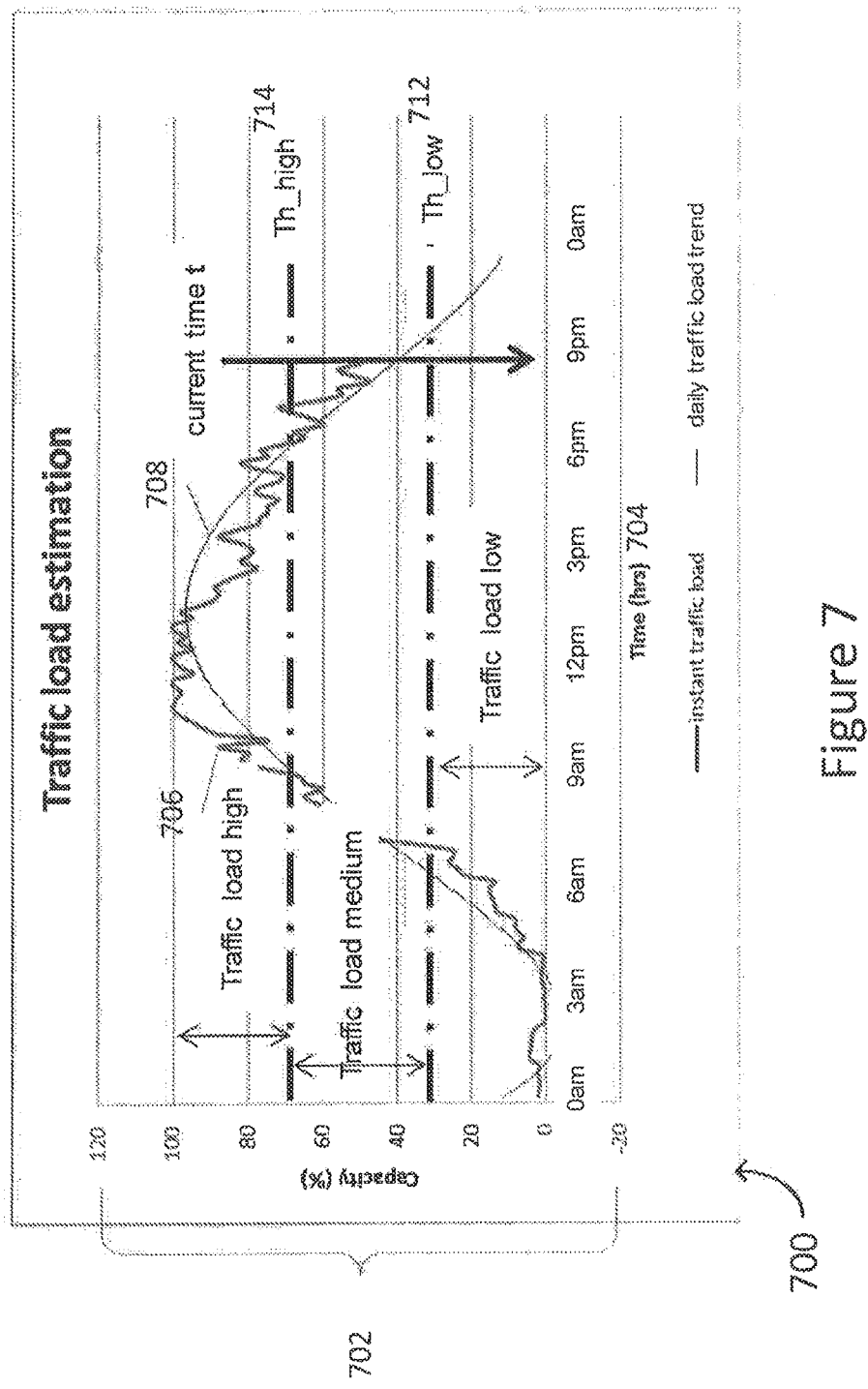
FIG. 7 is a graph illustrating example traffic load estimation.

FIG. 7 is a graph illustrating example traffic load estimation. Example graph 700 is an example of a traffic load estimation. In certain embodiments, the values of graph 700 may be determined by traffic engine 260. Example graph 700 may include, on the y-axis, capacity percentage 702 which may represent a traffic capacity percentage associated with network 100. On the x-axis, graph 700 may include time in any suitable unit (e.g., seconds, minutes, hours, etc.) at any suitable interval. Graph 700 includes two curves. Curve 706 is the instant traffic load which represents the current traffic load average for the last certain amount of seconds calculated in function f_i, where the last certain amount of seconds is configurable as suitable for a particular purpose. Curve 708 represents the daily average traffic load calculated in function f_d, which is calculated from the last certain number of days, wherein the last certain number of days is configurable as suitable for a particular purpose. Graph 700 may also include thresholds 712 and 714. Threshold 712 may be a "low" threshold and threshold 714 may be a "high" threshold. In certain embodiments, when the traffic load is below threshold 712, the traffic load is deemed to be "low." If the traffic load is above threshold 714, then the traffic load is deemed to be "high." Otherwise, the traffic load may be deemed to be medium. Thresholds 712 and 714 are configurable as suitable for a particular purpose.

FIG. 8 is a graph illustrating example data that may be used in a priority lookup table. Example graph 800 is example data that may be associated with a priority lookup table that may be used by the systems described in FIGS. 1, 2, 3, and/or 4. Example graph 800 includes value 802 on the y-axis which may represent a real value associated with data that may be in data queue 250. Example graph 800 also includes waiting time 804 on the x-axis which may represent a wait time associated with data that may be in data queue 250. Curves 806, 808, and 810 represent priority values that may be associated with certain QoS class of identifier (QCI). For example, curve 806 may be associated with "QCI Z," curve 808 may be associated with "QCI Y," and curve 810 may be associated with "QCI X."

Figure 9:
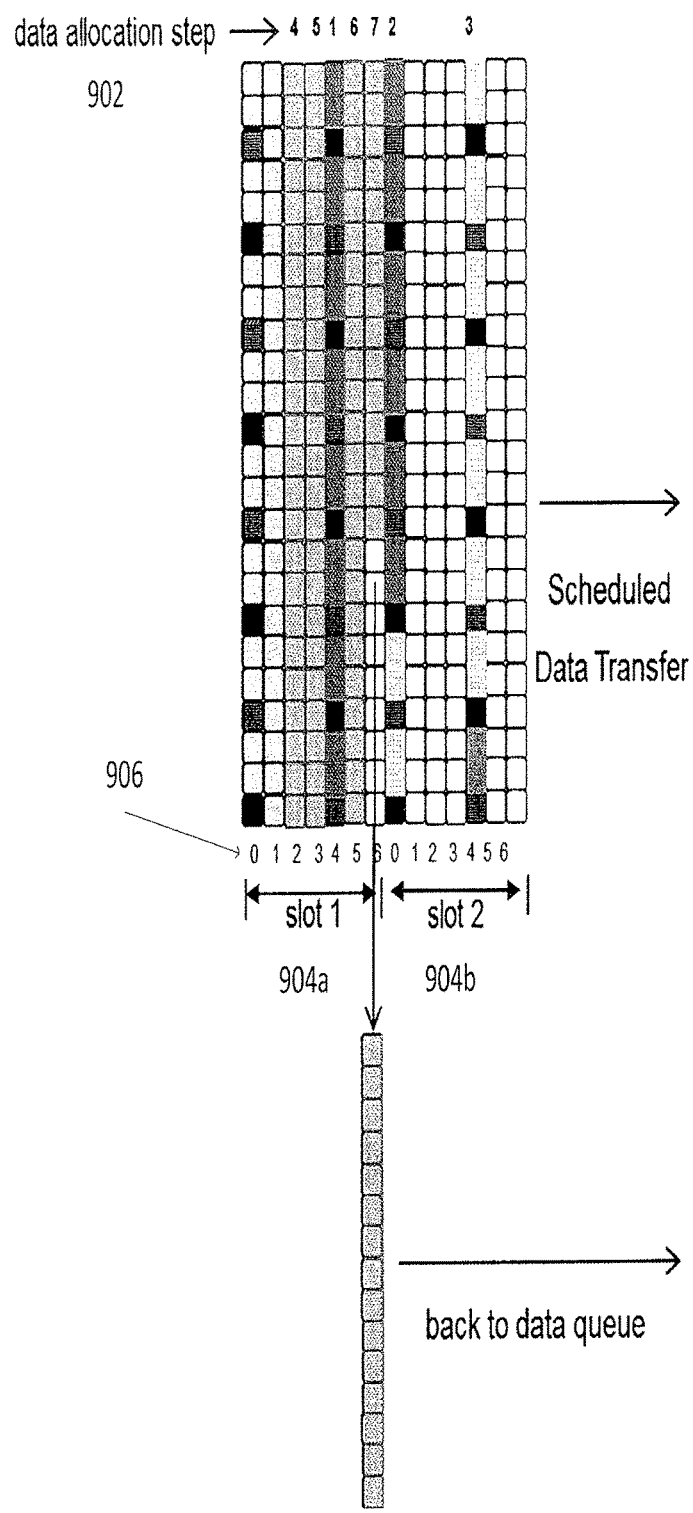
FIG. 9 is a block diagram illustrating embodiments of mapping resource elements to symbols.

FIG. 9 is a block diagram illustrating embodiments of mapping resource elements to symbols. FIG. 9 depicts an example diagram of how DTX may be implemented at the symbol level by the systems described in FIGS. 1, 2, 3, and/or 4. In certain embodiments, the example DTX implementation may be performed by scheduling engine 280 and/or DTX engine 290. The example diagram includes data allocation steps 902, slots 904, and symbols 906.

In the example, it is assumed that the first two symbols 906 (e.g., 0 and 1 on slot 904a) in the current TTI may be used for the PDCCH, which means that the available symbols 906 may be 2 through 6 in slot 904a and 0 through 6 in slot 904b. In the example, symbol 906 "4" in slot 904a and symbol 906 "0" and "4" in slot 904b are depicted as being used for cell reference signal transfer (depicted as darker squares in the diagram). Because they are being used for cell reference signal transfer, these particular symbols 906 will be used (or transmitted) whether or not any other data is allocated to those symbols 906. Therefore, data allocation may begin at symbol 906 "4" of slot 904a, with the high priority data first, then go to symbol 906 "0" of slot 904b, and then symbol 906 "4" of slot 904b. If there is still data in data queue 250, then the allocation continues at symbol 906 "2" through symbol 906 "6" of slot 904a and then symbol 906 "0" through symbol 906 "6" of slot 904b.

In the example diagram, symbols 906 "2," "3," "4," and "5" in slot 904a and symbol 906 "0" and symbol 906 "4" in slot 904b are fully allocated data, but symbol 906 "6" in slot 904a) is not fully allocated. If the data in this symbol 906 is low priority, then the data in symbol 906 "6" of slot 904a will be retuned back to data queue 250 for the next scheduling time slot and symbol 906 "6" of slot 904a may be DTXed. To reduce inter-cell interference, the symbol level DTX patterns can be randomized for different subframes.

Figure 10:
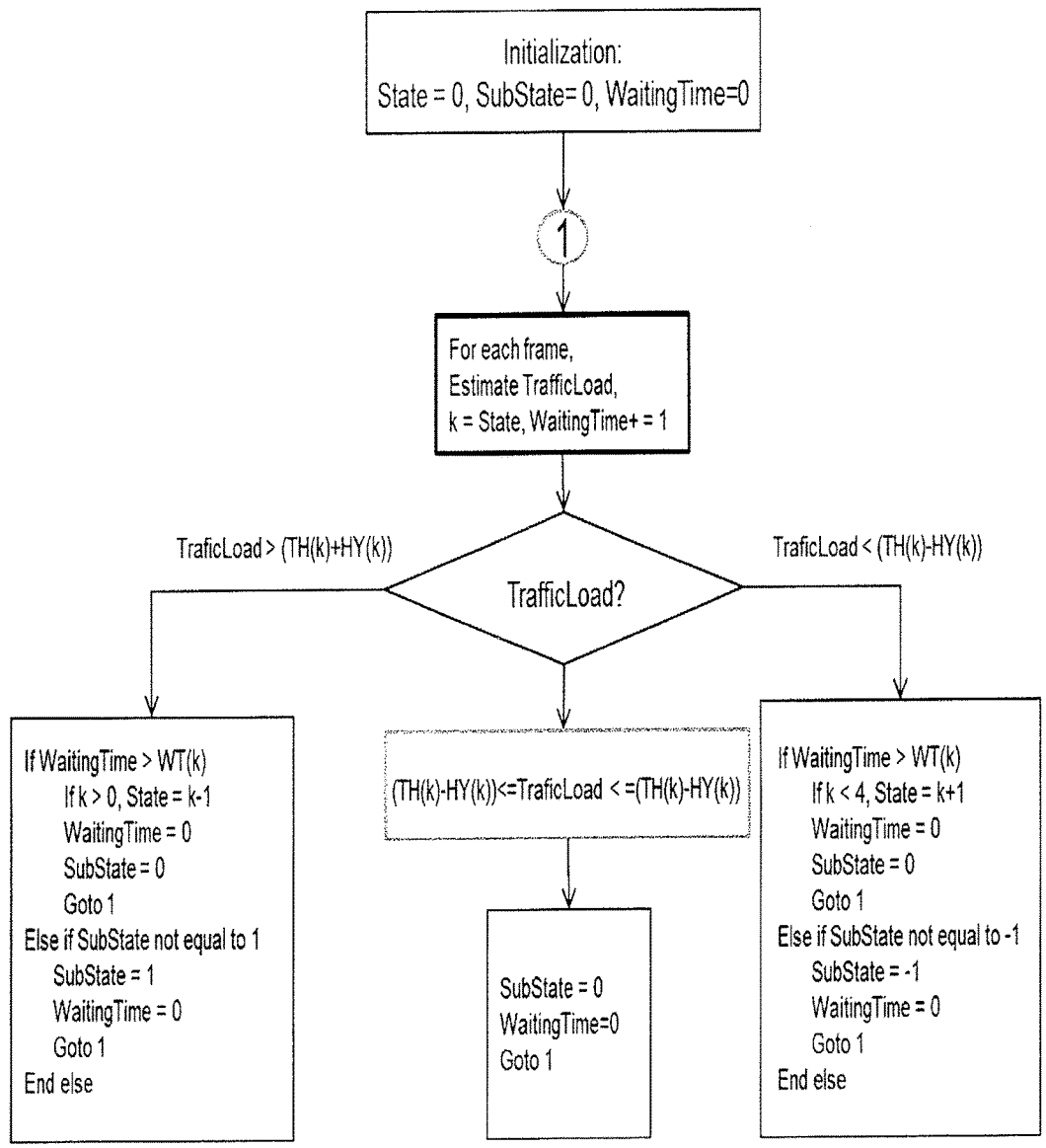
FIG. 10 is a flow chart illustrating embodiments of discontinuous transmission determination for subframes and frames.

FIG. 10 is a flow chart illustrating embodiments of discontinuous transmission determination for subframes and frames. Example method 1000 may be implemented by the systems described in FIGS. 1, 2, 3, and/or 4. Initially, it is assumed the traffic load is high for this example, and it is in state 0. Its SubState and WaitingTime are also set to 0. In this state, the subframe and the frame are not DTXed. For each frame, the traffic load is estimated first. If it is below (TH(0)−HY(0)) for WT(0) time, it will move to state 1. Otherwise, it will stay in this state.

When the state corresponds to medium traffic load, $2^k$ number of subframes are DTXed. When the measured traffic load is below (TH(k)−HY(k)) for WT(k) time, it will move to state=k+1. When the measured traffic load is above (TH(k) HY(k)) for WT(k) time, it will move to state=k−1. If the measured traffic load is between (TH(k)−HY(k)) and (TH(k)+HY(k)), it will stay in this state.

When the state corresponds to the low traffic load, the odd frames as well as eight subframes of the even frames are DTXed. When the measured traffic load is above (TH(4)+HY(4)) for WT(4) time, it will move to state 3. Otherwise, it will stay in this state.

For a certain State k, the value of SubState indicates the relative traffic load. When TrafficLoad is between (TH(k)−HY(k)) and (TH(k)+HY(k)), it is set to 0. When TrafficLoad is above (TH(4)+HY(4)), it is set to 1. When TrafficLoad is below (TH(k)−HY(k)), it is set to −1. To reduce inter-cell interference, the subframe level DTX patterns can be randomized for different frames.

Figure 11:
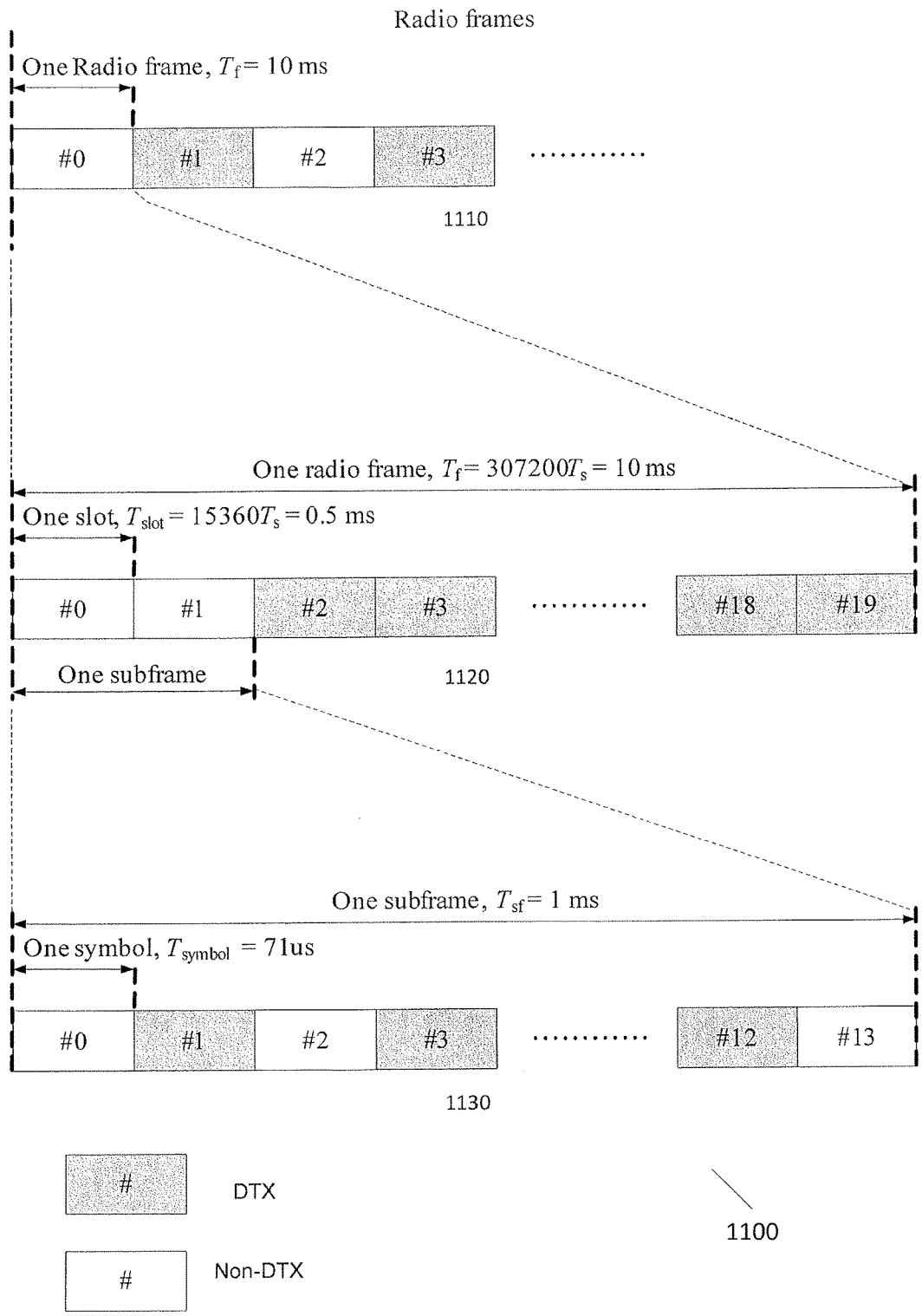
FIG. 11 is a diagram illustrating radio frame and subframe levels.

FIG. 11 is a diagram illustrating radio frame levels. Example frames 1100 may be examples of frame structure used by the systems described in FIGS. 1, 2, 3, and/or 4. FIG. 11 illustrates frames 110, subframes 1120, and symbols 1130. Certain frames 1110, subframes 1120, and symbols 1130 are depicted as being allocated for DTX.

Figure 12:
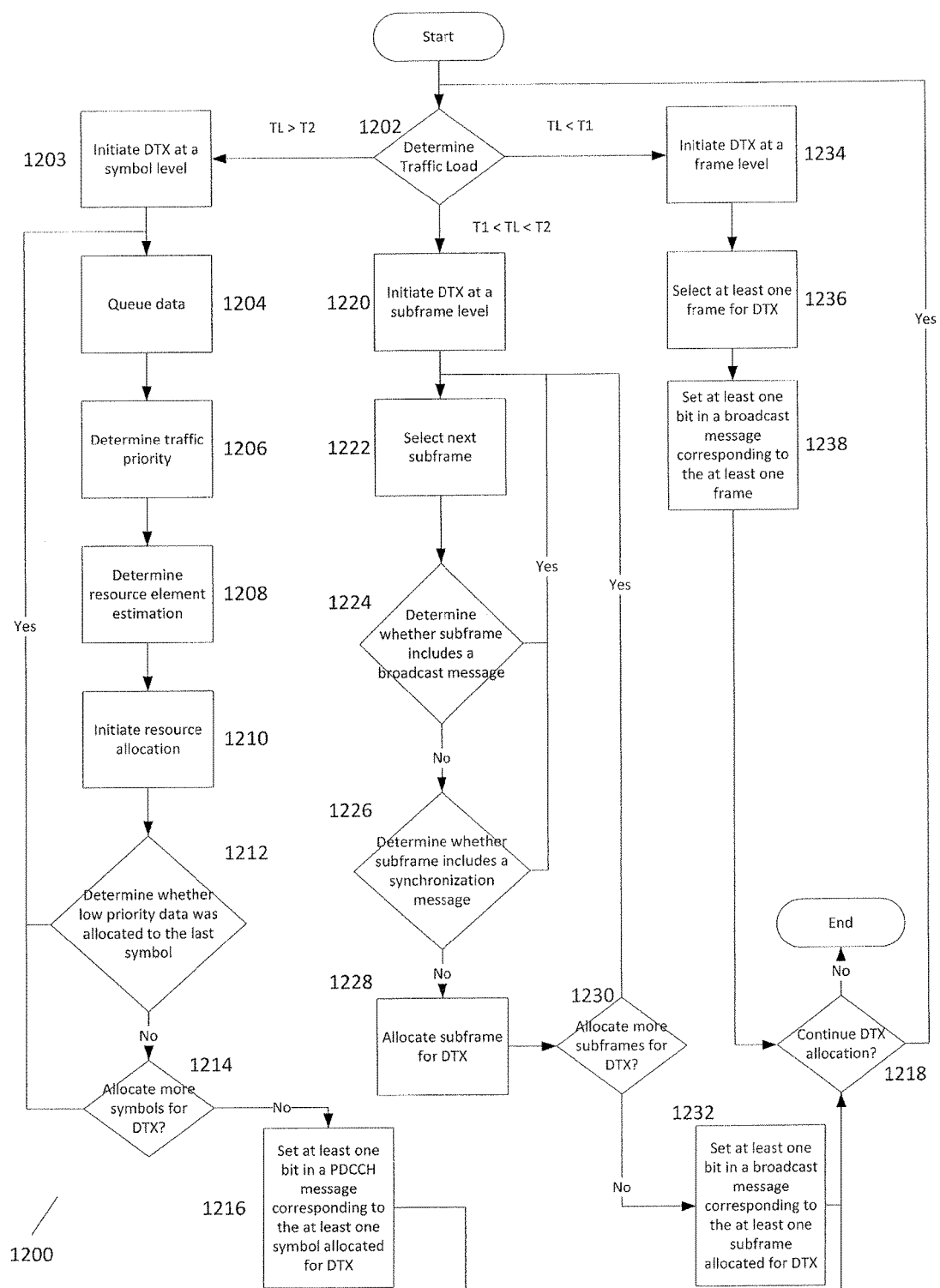
FIG. 12 is a flowchart illustrating example embodiments of discontinuous transmission for a mobile phone network node.

FIG. 12 is a flowchart illustrating example embodiments of discontinuous transmission for a mobile phone network node. In certain embodiments, the example method of FIG. 12 may be implemented by the systems described in FIGS. 1, 2, 3, and/or 4. Example method 1200 may begin at step 1202, where radio network node 120 may determine traffic load. Radio network node 120 may do this by using traffic engine 260 to determine how a predicted traffic load (TL) may compare to certain traffic load thresholds (e.g., T1, T2). For example, T1 may represent a low traffic load threshold and T2 may represent a high traffic load threshold. If TL exceeds T2, then it may be determined that traffic load is high and the example method may proceed to step 1203. If TL exceeds T1, but not T2, it may be determined that traffic load is medium and the example method may proceed to step 1220. Otherwise, if TL is below T1, then the example method may proceed to step 1234.

At step 1203, radio network node 130 may initiate DTX at the symbol level. Next, at step 1204, radio network node 130 may queue data. For example, radio network node 120 may queue data in data queue 250. At step 1206, radio network node 130 may determine traffic priority for the queued data. For example, radio network node 120 may use traffic engine 260 to determine traffic priority for data queued in data queue 250. The example method may then proceed to step 1208 where radio network node 120 may determine a resource element estimation. As an example, radio network node 120 may use scheduling engine 280 to determine a resource element estimation of data in data queue 250. Next, at step 1212, radio network node 120 may determine whether low priority data was allocated to the last symbol selected to carry data. If it is determined that low priority data may have been allocated to the last symbol selected to carry data, then the example method may return to step 1204 where the low priority data allocated to the last symbol may be re-queued in data queue 250. Otherwise, the example method may proceed to step 1214.

At step 1214, radio network node 120 may determine whether more symbols may be allocated for DTX. If so, the example method may return to step 1204. Otherwise, the example method may proceed to step 1216 where radio network node 120 may set at least one hit in a PDCCH message corresponding to the at least one symbol allocated for DTX. For example, radio network node 120 may use message engine 270 to set the at least one bit to correspond to the at least one symbol allocated for DTX. In certain embodiments, extra bits may be added to PDCCH messages to signal which symbols are in DTX. According to some embodiments, four bits may be added and may represent any number of symbols that may be in DTX. If three bits are added, then up to eight symbols can be signaled to be in DTX. In other embodiments, only two bits may be added to the PDCCH message to signal the DTX cases for one symbol, two symbols, four symbols, and eight symbols. The example method may then continue to step 1218 where radio network node 120 1218 may determine whether it should continue DTX allocation. If yes, then the example method may return to step 1202. Otherwise, the example method may end.

If the determined traffic load is at a medium level, then the example method may proceed starting at step 1220 where radio network node 120 may initiate DTX at a subframe level. The example method may proceed to step 1222 where a subframe is selected for analysis to determine whether it should be used for DTX. At step 1224, radio network node 120 may determine whether the particular subframe includes a broadcast message. If the subframe includes a broadcast message, then the example method may not use that subframe for DTX and may return to step 1222 where another subframe may be selected for analysis. Otherwise, the example method may proceed to step 1226. At step 1226, radio network node 120 may determine whether the particular subframe includes a synchronization message. If the subframe includes a synchronization message, then the example method may return to step 1222. Otherwise the example method may proceed to step 1228 where the particular subframe is allocated for DTX. For example, radio network node 120 may use DTX engine 290 and/or scheduling engine 280 to allocate the particular subframe for DTX. The example method may proceed to step 1230 where radio network node 120 may determine whether or not to allocate more subframes for DTX. If more subframes may be allocated, then the example method may proceed to step 1222 where another subframe is selected for analysis.

Otherwise, the example method may proceed to step 1232 where radio network node 120 may set at least one bit in a broadcast message corresponding to the at least one subframe allocated for DTX. For example, radio network node 120 may use message engine 270 to set the at least one bit to correspond to the at least one symbol allocated for DTX. In certain embodiments there may be ten subframes in a radio frame. In such embodiments one subframe may include a broadcast message and one subframe may include a synchronization message (both of which are not subject to DTX). Extra two bits in the broadcast message can be used to identify how many of the remaining subframes are DTXed. For example, radio network node 120 may use message engine 270 and/or scheduling engine 280 to set the bits to "00" to indicate no subframes are DTXed, "01" to indicate two subframes are DTXed, "10" to indicate four subframes are DTXed, and "11" to indicate that eight subframes are DTXed. The example method may then proceed to step 1218 (discussed previously).

If the determined traffic load is at a low level, then the example method may proceed starting at step 1234 where DTX may be initiated at the frame level by radio network node 120. Next, at step 1236, radio network node 120 may select at least one frame for DTX. For example, radio network node 120 may use DTX engine 290 and/or scheduling engine 280 to do this. At step 1238, radio network node 120 may then set at least one broadcast message corresponding to the at least one frame selected for DTX. In certain embodiments, one bit may be used in a broadcast message to indicate if odd frames are on or off. In such an embodiment, radio network node 120 may use message engine 270 to set this bit. The example method may then proceed to step 1218, discussed above.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A mobile phone network node operable to:
   determine traffic load associated with a mobile phone network; and
   initiate discontinuous transmission at a first one of a frame level, a subframe level, and a symbol level, based at least in part upon a comparison of the traffic load to a first threshold, wherein the mobile phone network node is operable to initiate discontinuous transmission at the symbol level by:
   determining whether a symbol includes a reference signal;
   using the symbol for discontinuous transmission if the symbol does not include the reference signal and no data is allocated to the symbol.

2. The mobile phone network node of claim 1, wherein the mobile phone network node is further operable to initiate discontinuous transmission at a second one of a frame level, a subframe level, and a symbol level, based at least in part upon a comparison of the traffic load to a second threshold.

3. The mobile phone network node of claim 2, wherein the mobile phone network node is further operable to initiate discontinuous transmission at a third one of a frame level, a subframe level, and a symbol level, based at least in part upon a comparison of the traffic load to a third threshold.

4. The mobile phone network node of claim 1, wherein the traffic load is determined based at least in part upon a daily traffic load and an instant traffic load.

5. The mobile phone network node of claim 1, further operable to
allocate data to the symbol that includes the reference signal.

6. The mobile phone network node of claim 5, wherein the mobile phone network node operable to allocate data to the symbol that includes the reference signal comprises the mobile phone network operable to allocate high priority data before low priority data.

7. The mobile phone network node of claim 1, wherein the mobile phone network node operable to initiate discontinuous transmission at the first one of a frame level, a subframe level, and a symbol level comprises the mobile phone network node operable to initiate discontinuous transmission at the subframe level by:
determining whether a subframe includes a broadcast message;
determining whether the subframe includes a synchronization message; and
using the subframe for discontinuous transmission if:
the subframe does not include the broadcast message; and
the subframe does not include the synchronization message.

8. The mobile phone network node of claim 1, wherein the mobile phone network node operable to initiate discontinuous transmission at the first one of a frame level, a subframe level, and a symbol level comprises the mobile phone network node operable to initiate discontinuous transmission at the frame level by:
indicating at least one frame to be used for discontinuous transmission by setting at least one bit in a broadcast message to correspond to the frame.

9. A discontinuous transmission method for an Evolved Node B comprising:
determining traffic load associated with a mobile phone network;
initiating discontinuous transmission at a first one of a frame level, a subframe level, and a symbol level, based at least in part upon a comparison of the traffic load to a first threshold, wherein initiating discontinuous transmission at the symbol level comprises initiating discontinuous transmission at the symbol level by:
determining whether a symbol includes a reference signal; and
using the symbol for discontinuous transmission if the symbol does not include a reference signal and no data is allocated to the symbol.

10. The method of claim 9, further comprising initiating discontinuous transmission at a second one of a frame level, a subframe level, and a symbol level, based at least in part upon a comparison of the traffic load to a second threshold.

11. The method of claim 10, further comprising initiating discontinuous transmission at a third one of a frame level, a subframe level, and a symbol level, based at least in part upon a comparison of the traffic load to a third threshold.

12. The method of claim 9, wherein determining traffic load comprises determining traffic load based at least in part upon a daily traffic load and an instant traffic load.

13. The method of claim 9, further comprising
allocating data to the symbol that includes the reference signal.

14. The method of claim 13, wherein allocating data to the symbol that includes the reference signal comprises allocating high priority data before low priority data.

15. The method of claim 9, wherein initiating discontinuous transmission at the first one of a frame level, a subframe level, and a symbol level comprises initiating discontinuous transmission at the subframe level by:
determining whether a subframe includes a broadcast message;
determining whether the subframe includes a synchronization message; and
using the subframe for discontinuous transmission if:
the subframe does not include the broadcast message; and
the subframe does not include the synchronization message.

16. The method of claim 9, wherein initiating discontinuous transmission at the first one of a frame level, a subframe level, and a symbol level comprises initiating discontinuous transmission at the frame level by:
indicating at least one frame to be used for discontinuous transmission by setting at least one bit in a broadcast message to correspond to the frame.

17. A discontinuous transmission system comprising:
a memory; and
a processor operable to:
determine traffic load associated with a mobile phone network; and
initiate discontinuous transmission at a first one of a frame level, a subframe level, and a symbol level, based at least in part upon a comparison of the traffic load to a first threshold, wherein the processor is operable to initiate discontinuous transmission at the subframe level by:
determining whether a subframe includes a broadcast message;
determining whether the subframe includes a synchronization message; and
using the subframe for discontinuous transmission if:
the subframe does not include the broadcast message; and
the subframe does not include the synchronization message.

18. The system of claim 17, wherein the processor is further operable to initiate discontinuous transmission at a second one of a frame level, a subframe level, and a symbol level, based at least in part upon a comparison of the traffic load to a second threshold.

19. The system of claim 18, wherein the mobile phone network node is further operable to initiate discontinuous transmission at a third one of a frame level, a subframe level, and a symbol level, based at least in part upon a comparison of the traffic load to a third threshold.

20. The system of claim 17, wherein the processor is operable to determine traffic load based at least in part upon a daily traffic load and an instant traffic load.

21. The system of claim 17, wherein the processor is further operable to:
determine whether a symbol includes a reference signal; and
allocate data to the symbol that includes the reference signal.

22. The system of claim 21, wherein the processor operable to allocate data to the symbol that includes the reference signal comprises the processor operable to allocate high priority data before low priority data.

23. The system of claim 17, wherein the processor operable to initiate discontinuous transmission at the first one of a frame level, a subframe level, and a symbol level comprises the processor operable to initiate discontinuous transmission at the frame level by:
   indicating at least one frame to be used for discontinuous transmission by setting at least one bit in a broadcast message to correspond to the frame.

24. The processor of claim 17, wherein the processor operable to initiate discontinuous transmission at the first one of a frame level, a subframe level, and a symbol level comprises the processor operable to initiate discontinuous transmission at the symbol level by:
   determining whether a symbol includes a reference signal; and
   using the symbol for discontinuous transmission if the symbol does not include a reference signal and no data is allocated to the symbol.

\* \* \* \* \*